Aug. 19, 1947.  A. A. CADWALLADER  2,425,992
QUICK-ACTING CONNECTION
Filed June 20, 1945
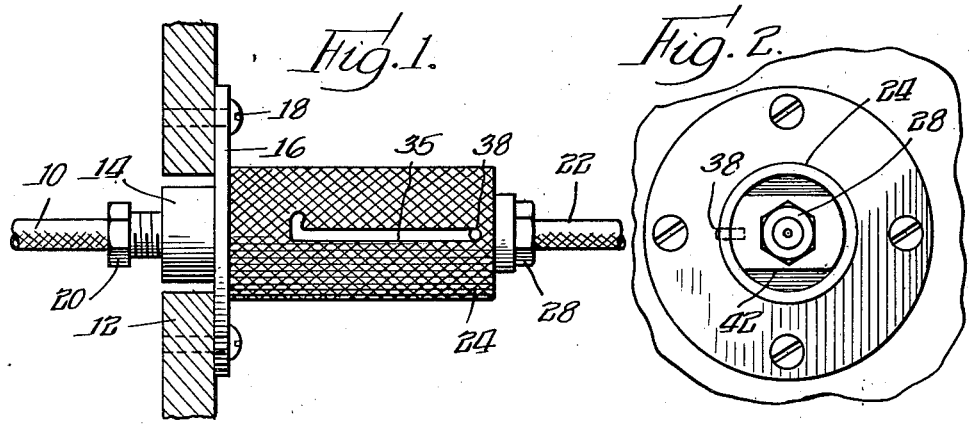
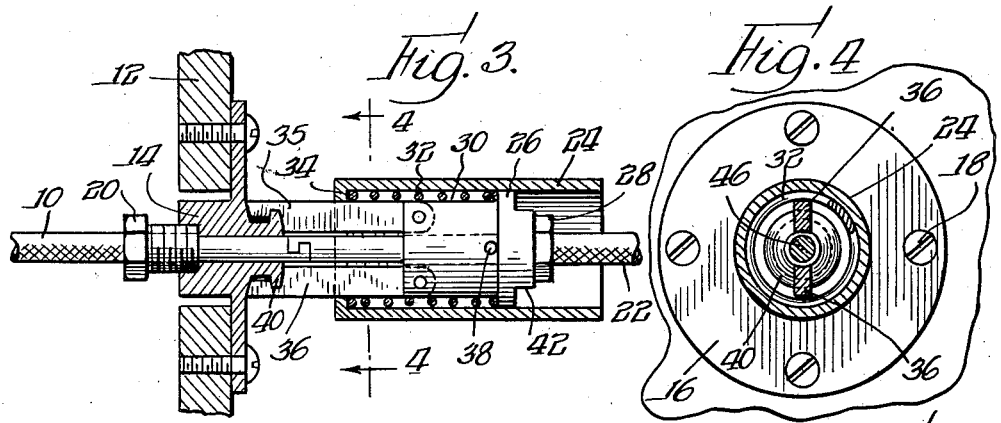
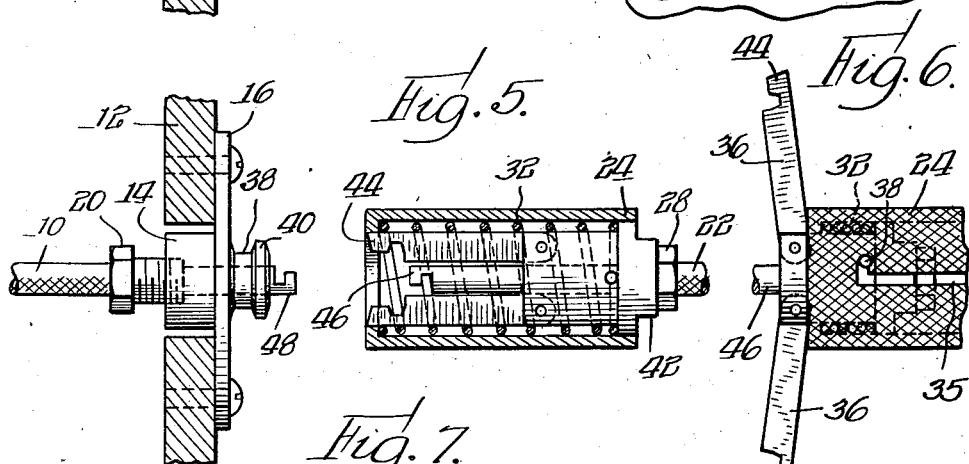
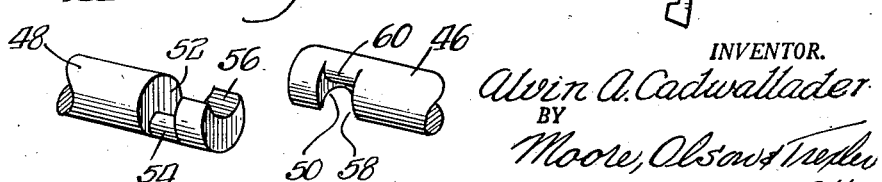
INVENTOR.
Alvin A. Cadwallader
BY
Moore, Olson & Trexler
Attys.

Patented Aug. 19, 1947

2,425,992

UNITED STATES PATENT OFFICE 2,425,992

QUICK-ACTING CONNECTION

Alvin A. Cadwallader, Philadelphia, Pa., assignor to Teleflex Incorporated, Philadelphia, Pa., a corporation of Delaware Application June 20, 1945, Serial No. 600,457

6 Claims. (Cl. 64—4)

My invention relates to a quick-acting connection, and more particularly to a device enabling the rapid connection and disconnection of a control cable.

In flexible control cables it is necessary to couple the cable to a control device and a remote control mechanism. Frequently it is also necessary to interconnect several lengths of flexible control cable or to provide connections to interposed apparatus. For certain applications, it is necessary to provide an arrangement whereby the cable may be rapidly and quickly connected and disconnected.

Heretofore connecting and disconnecting devices have been provided, but generally such devices have had numerous disadvantages in that tools were required to operate the apparatus or that the structure is one which could not be readily actuated for the connecting and disconnecting operation without the use of tools and without introducing into such connections binding actions, rattling, or corrosion and rust where the connections are exposed to dirt and moisture.

It is desirable to avoid the use of exteriorly arranged springs and also the use of complicated cam arrangements for maintaining positive cooperation between the two portions of the coupling device. In certain installations it furthermore is highly desirable to provide a connection where substantially a single movement of one hand may serve to rapidly disconnect the control cable.

In accordance with the present invention, a quick-acting connecting and disconnecting device is provided which is particularly adapted for coupling tubing, rods, electric cable, and control cables. This means provides within a narrow housing or sleeve an assembly which is protected against the elements and prevents dislodgement or injury and yet provides a positive interlocking of the two cable portions without the use of a complicated structure. This is accomplished by providing on one member a grooved cylindrical button-like member which is engaged by a pair of interlocking jaws having tapered engaging portions which facilitate automatic disengagement of the jaws from the adjacent annular flange of the groove member when the sleeve is forced away from said member.

It, therefore, is an object of the present invention to provide an improved quick-acting connecting and disconnecting device.

It is another object of the present invention to provide an improved connecting and disconnecting device which normally is enclosed in a housing for protection against the elements and possible injury.

A still further object of the present invention is to provide an improved connecting and disconnecting device which is readily detachable without the use of tools.

Other and further objects of the present invention subsequently will become apparent by reference to the following description, taken in connection with the following drawings wherein Fig. 1 is a side view of a connecting and disconnecting device embodying the present invention;

Fig. 2 is an end view of the arrangement shown in Fig. 1;

Fig. 3 is a cross sectional view taken longitudinally through the device as shown in Fig. 1;

Fig. 4 is a cross sectional view as seen in the direction of the arrows along the line 4—4 of Fig. 3;

Fig. 5 shows the arrangement of the parts in disconnected relation;

Fig. 6 illustrates the manner in which the jaws are moved outwardly away from the cable coupling joint; and Fig. 7 is a perspective view illustrating the details of a preferred cable joint.

To illustrate conveniently the application of the present invention, it may be assumed that one end of a control cable such as a cable 10 extends up to a wall 12 where the end of the cable is supported by a coupling member 14 having a mounting flange 16 secured in position by suitable fastening means or screws 18. As may be seen from Fig. 3, the rear of the member 14 is provided with a threaded aperture into which is fitted a clamping bushing 20 which engages the outer surface of the flexible cable 10. It will be appreciated that the flexible cable 10 may be of any conventional type of structure having an outer casing and a movable inner core. This inner core may be arranged for rotary movement or for limited longitudinal movement, dependent upon the installation of the apparatus to be controlled thereby.

A cooperating flexible cable having an outer conduit 22 is shown connected to the other portion of the connecting and disconnecting device having an outer sleeve 24. As may be seen from Fig. 3 the outer sleeve 24 encloses an end member 26 to which the cable 22 is connected by a clamping sleeve 28 which is constructed similarly to the clamping sleeve 20. The member 26 is provided with a reduced diameter portion 30 to provide sufficient space between the inner diameter of the outer sleeve 24 to accommodate a coiled spring 32. The coiled spring 32 therefore bears against the member 26 and the flange 34 of the sleeve 24. The sleeve 24 is provided with a bayonet slot 35 which cooperates with a bayonet pin 38. The pin 38 is secured to the member 26.

The member 26 has two pivoted jaws 36 which are arranged to engage a portion of the other coupling member 14. The coupling member 14 has a button-like structure formed by a groove 38 and a flange 40. The outer surface of the flange 40 is suitably chamfered so as to readily spread apart the jaws 36 when the coupling device is to be connected. The groove 38 has tapered walls to facilitate rapid disconnection of the coupling device as will subsequently become apparent.

The member 26 adjacent the end where the clamping sleeve 28 is secured, may be formed so as to have two parallel surfaces 42 for engagement by a wrench or other tool to hold this member while the clamping sleeve 28 is moved into position. At the other end of the member 26 the pair of jaws 36 are pivotally mounted. Each jaw has a hook-like portion 44 provided with tapered sides so as to be substantially complementary to the tapered wall groove 38 on the member 14. The jaws 36 furthermore may be provided with a configuration which is complementary to the configuration of the flange 40 of the member 14. Within the member 24 there is positioned a coupling joint member 46 for cooperation with a corresponding coupling joint member 48 contained within the member 14.

The coupling joint members 46 and 48 are shown in detail in perspective in Fig. 7. Adjacent the end of the member 46 there is provided a concave recess 50 for cooperation with a recess 52 in the member 48 which has a cylindrical section 54 of a configuration complementary to the concave surface of the recess 50. Similarly the member 48 at its end has a concave recess 56 for cooperation with the recess 58 in the member 46 which at its bottom is provided with a cylindrical section portion 60 complementary to the concave surface of the recess 56. These two complementary members 46 and 48 interlock when coupled in the manner illustrated in Fig. 3. These members therefore connect the flexible control contained within the cable housings 10 and 22 for either rotational movement of these cables or limited longitudinal movement.

Fig. 1 shows the quick connecting and disconnecting device in the position where the flexible cables within the housings 10 and 22 are interconnected by the device. It may now be assumed that it is desired rapidly to disconnect the two cables. In order to accomplish this it is merely necessary to grasp the knurled sleeve 24 and move it toward the right. The sleeve will therefore be moved away from the flange 16 in a manner illustrated in Fig. 3. When the sleeve has been moved rearwardly a sufficient distance the jaws 36 will be able to separate so as to permit the jaws to become disengaged from the groove 38. A slight twisting motion or upward movement of the coupling member will disengage the members 46 and 48.

When the spring is completely compressed the pin 38 may be lodged in the circumferential extending portion of the bayonet slot to hold it in compressed position, thus enabling the jaws 36 to be swung outwardly readily as shown in Fig. 6. This permits the members 46 and 48 to be readily engaged. When this has been accomplished a slight rotation of the sleeve 24 will unlock the bayonet joint so as to permit the sleeve to move outwardly under the influence of the spring 32 and bear against the arms 36 of the body members so that they engage the groove 38. The movement of the sleeve 24 to the full limit of the slot 35 in a direction toward the left positions the sleeve against the member 14 as illustrated in Fig. 1.

From the foregoing it will be seen that I have provided a readily operable connecting and disconnecting device which may be shifted to disconnecting position and retained in such position by means of the bayonet slot 35 and the bayonet 38. As soon as the bayonet joint is released, the internal spring 32 urges the sleeve 24 toward its locking position. No other cams or other positively acting means are required in order to provide a firm connection between the two control cables. The tapered or bevel body portions 44 of the jaws permit such interlocking as to effect a slightly binding action which eliminates all looseness in the coupling which might otherwise contribute to rattling or noise.

This same slight taper on the inner side of each of the jaws facilitates automatic disengagement of the jaws from the annular flange 40 adjacent the groove 38 when the sleeve 24 is moved against the action of the spring 32. Unless the sleeve, however, is moved relative to the member 26, there is no tendency for the cables to become separated due to tension or torque, as it will be apparent that the control cable may be given any desired movement, either in rotation or longitudinal movement with respect to its axis, or both.

The oppositely arranged pair of jaws 36 are adapted to be swung outwardly away from the cable connector joint members 46 and 48 and retained in such position by virtue of the bayonet slot 35. The spring 32 normally maintains the sleeve 24 in the position shown in Fig. 1 so that a protective covering is provided about the enclosed mechanism which prevents unintentional opening of the jaws and protects the device against injury and against the elements.

While for the purpose of illustrating and describing the present invention certain embodiments have been shown in the drawing, it is to be understood that certain variations are contemplated. For example, the member 14 need not be secured to a rigid surface, and hence in such instance the flange 16 may be omitted. Similarly other variations are also contemplated as may be commensurate with the spirit and scope of the invention set forth in the following claims.

1. A quick-acting connection for control cables including in combination a pair of sheaths, elongated control members housed within said sheaths for movement therein, said control members having their ends projecting from said sheaths and formed with interlocking means, a detent attached to one of said sheaths, a pivoted member attached to the other of said sheaths, said pivoted member being formed with a portion adapted to engage said detent, a sleeve for holding said pivoted member in detent-engaging position, and a spring for urging said sleeve to holding position.

2. A quick-acting connection for control wires including in combination a pair of sheaths, control wires housed within said sheaths for movement therein, said wires being formed with ends projected beyond said sheaths and having interengaging means attached thereto, a flange attached to one of said sheaths, a plurality of pivoted members attached to the other of said sheaths, said pivoted members being formed with hook portions adapted to engage said flange to connect said sheaths, and a sleeve readily movable over said pivoted members to hold them in flange engaging position.

3. A quick-acting connection as in claim 2, having a spring urging said sleeve to pivoted member locking position.

4. A quick-acting connection as in claim 2, including in combination a spring for urging said sleeve to pivoted member holding position, and means for holding said sleeve in disengagement from said pivoted members against the action of said spring.

5. A quick-acting connection as in claim 2, in which said flange is formed with a tapered portion adapted to cam said pivoted members to disengaged position.

6. A quick-acting connection as in claim 2, in which means are provided to secure said flange to a structural surface.

ALVIN A. CADWALLADER.

REFERENCES CITED

The following references are of record in the file of this patent:

UNITED STATES PATENTS

| Number | Name | Date |
|---|---|---|
| 1,691,200 | Krug | Nov. 13, 1928 |
| 1,287,385 | Martin | Dec. 10, 1918 |

FOREIGN PATENTS

| Number | Country | Date |
|---|---|---|
| 537,236 | France | 1922 |